(12) United States Patent
Ehegartner

(10) Patent No.: US 12,540,694 B2
(45) Date of Patent: Feb. 3, 2026

(54) METHOD FOR PRODUCING A CONNECTION, AND CONNECTION DEVICE

(71) Applicant: Linde GmbH, Pullach (DE)

(72) Inventor: Florian Ehegartner, Pullach (DE)

(73) Assignee: Linde GmbH, Pullach (DE)

( * ) Notice: Subject to any disclaimer, the term of this patent is extended or adjusted under 35 U.S.C. 154(b) by 365 days.

(21) Appl. No.: 18/255,004

(22) PCT Filed: Dec. 1, 2021

(86) PCT No.: PCT/EP2021/025479
§ 371 (c)(1),
(2) Date: May 30, 2023

(87) PCT Pub. No.: WO2022/117231
PCT Pub. Date: Jun. 9, 2022

(65) Prior Publication Data
US 2024/0027003 A1 Jan. 25, 2024

(30) Foreign Application Priority Data
Dec. 4, 2020 (EP) ..................................... 20020591

(51) Int. Cl.
*F16L 23/16* (2006.01)
*F16L 23/00* (2006.01)
(Continued)

(52) U.S. Cl.
CPC ........... *F16L 23/167* (2013.01); *F16L 23/003* (2013.01); *F16L 23/02* (2013.01); *F16L 23/16* (2013.01); *G01M 3/28* (2013.01); *F16L 2201/30* (2013.01)

(58) Field of Classification Search
CPC ....... F16L 23/167; F16L 23/003; F16L 23/02; F16L 23/16; F16L 2201/30; G01M 3/28
(Continued)

(56) References Cited

U.S. PATENT DOCUMENTS 4,406,458 A * 9/1983 Maier ...................... F16J 15/06
277/910
4,519,411 A * 5/1985 Takahashi ........... F16L 55/1007
137/219
(Continued)

FOREIGN PATENT DOCUMENTS

DE 102008012739 A1 9/2009
EP 2058573 A1 5/2009
(Continued)

OTHER PUBLICATIONS

Translation of WO-2009118961-A1 (Year: 2009).*

*Primary Examiner* — Nathaniel T Woodward
(74) *Attorney, Agent, or Firm* — Millen, White, Zelano & Branigan, P.C.; Brion P. Heaney

(57) ABSTRACT

A method for producing a connection, between attachment ends of two components that are to be connected, by means of two connection flanges, each of which is provided at one attachment end, wherein a sealable cavity is formed between those sides of the two connection flanges that are to face each other, wherein a closable and, if necessary, openable channel is provided between the cavity and a surrounding environment, and a negative pressure is generated in the cavity and the channel is closed, wherein a trigger mechanism is provided which is configured to open the channel in an automated manner upon the occurrence of a trigger criterion, and also to a corresponding connection device and to the use thereof.

18 Claims, 1 Drawing Sheet

(51) Int. Cl.
*F16L 23/02* (2006.01)
*G01M 3/28* (2006.01)

(58) Field of Classification Search
USPC .............................................. 73/37
See application file for complete search history.

(56) References Cited

U.S. PATENT DOCUMENTS

| | | | | | |
|---|---|---|---|---|---|
| 5,388,809 | A | * | 2/1995 | Hemsath | C21D 9/67 |
| | | | | | 266/256 |
| 8,701,467 | B2 | * | 4/2014 | Carns | G01M 3/2853 |
| | | | | | 285/123.1 |
| 2007/0284375 | A1 | * | 12/2007 | Perell | B65D 43/26 |
| | | | | | 220/316 |

FOREIGN PATENT DOCUMENTS

| | | | | | |
|---|---|---|---|---|---|
| EP | 2256393 | A1 | | 12/2010 | |
| GB | 958345 | A | * | 5/1964 | .......... F16L 19/0212 |
| WO | WO-2009118961 | A1 | * | 10/2009 | ............ F16L 23/167 |
| WO | 2013152419 | A1 | | 10/2013 | |

* cited by examiner

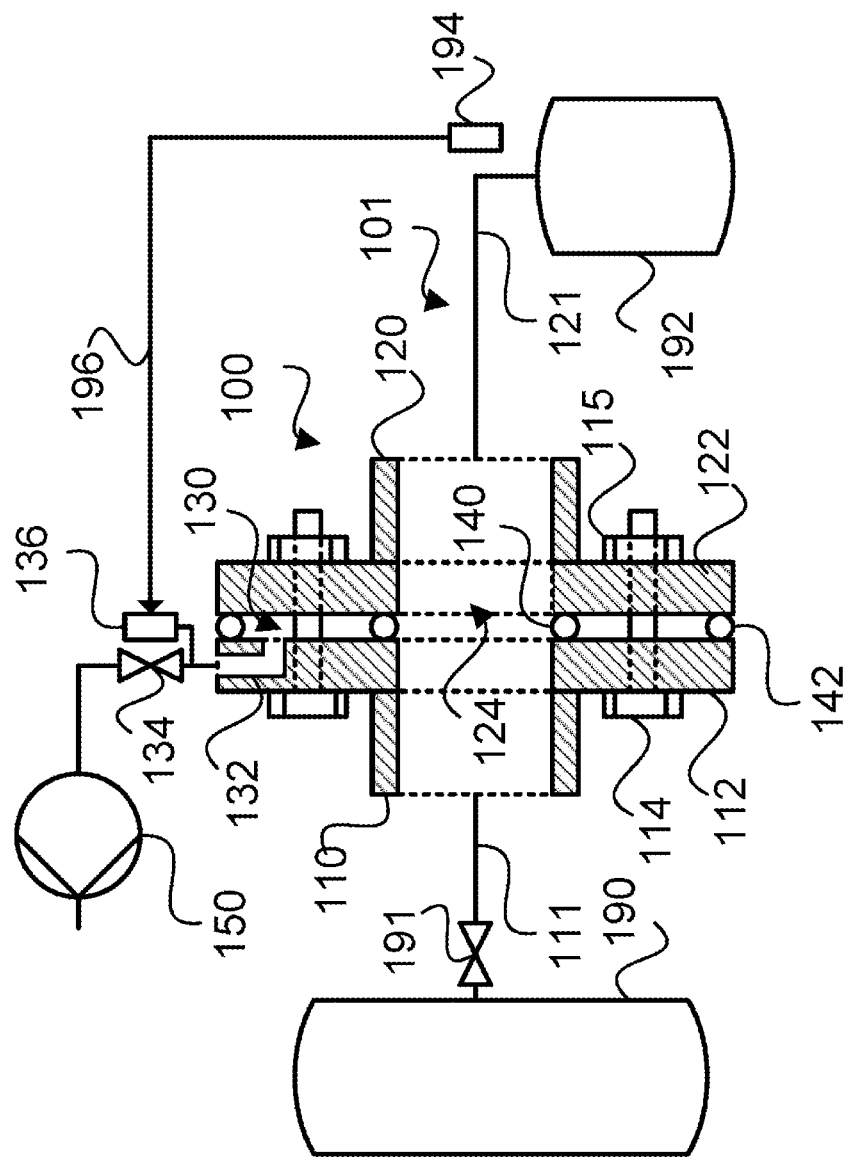

METHOD FOR PRODUCING A CONNECTION, AND CONNECTION DEVICE

The invention relates to a method for producing a connection between attachment ends of two components that are to be connected, to a corresponding connection device, and to a transfer line having such a connection device.

Transfer lines for liquefied gas typically have multiple portions which generally must be connected to each other at certain points. This is the case, for example, when a hose is connected to a container or to a connecting piece thereof. For normal operation, such a connection should be able to absorb large forces; however, in the event of an overload, it is desirable that only small forces act on other components involved, in order to prevent any damage.

So-called predetermined breaking points are known from different fields. These can be used in general for the mentioned purpose. In the case of high-pressure vessels, so-called burst disks can be provided as predetermined breaking points, for example; the use of another, weaker material at certain points of the connection is also conceivable. This then yields in a targeted manner in the event of overload. However, conventional predetermined breaking points are difficult to provide in the aforementioned transfer lines, and also generally in pipe or hose connections.

In light of this background, it is an object of the invention to provide an option for a connection between two attachment ends of components such as hoses or pipes, which connection should be secure and able to absorb high forces, and which, in the event of overload, should, to the greatest degree possible, cause no damage to involved components.

DISCLOSURE OF THE INVENTION

This object is achieved by a method for the production of a connection, and by a connection device having the features of the independent claims. Preferred embodiments are the subject-matter of the dependent claims and the following description.

Advantages of the Invention

The invention is concerned with the production of a connection between attachment ends of two components that are to be connected, by means of or using two connection flanges, each of which is provided at a attachment end. Suitable components are in particular hoses or pipes, or generally lines, for gases, liquids or liquefied gases, for example. In particular, the components under consideration are portions of a transfer line for liquefied gas. However, it should be mentioned at this juncture that the invention is ultimately suitable for any type of components that are to be connected.

Typically, two connection flanges are connected to each other by a connection with connection means, such as screw connections (screws and nuts, or threaded rods with nuts, and optionally also clamps, can be contemplated). Screws are, for example, guided through suitably arranged holes in the connection flanges. In particular in case where pipes or hoses will be connected, it is expedient to insert a seal, such as, for example, a rubber seal, between the two connection flanges and/or the sides or surfaces which will face each other.

In order to be able to ensure normal operation—that is, with normal loads and forces on the connection or the connection point, as are experienced for example during the transfer of liquefied gas through a transfer line (where two portions are correspondingly connected to each other), or optionally when the same is handled—the connection means must fulfill certain requirements (thickness of the screws, etc.). Even if the connection means were to break in the event of overload—i.e., for example, in the event of (significantly) greater forces on the connection than is typical, for example—there would then be excessive forces applied to other components involved. In this respect, the connection means cannot be designed to be so weak that they would no longer be able to ensure normal operation. The same applies in general to other components, such as the connection flanges themselves.

The invention proceeds from this background. It is proposed to form a sealable cavity between sides of the two connection flanges which will face each other, and to provide a channel between the cavity and the surrounding environment, which channel can be closed and opened as required. To establish the connection, the cavity is then evacuated, or at least a negative pressure is generated therein, and the channel is closed. By means of the vacuum or the negative pressure, it is achieved that the two connection flanges are held on each other or are pressed against each other by the overpressure from the outside. With suitable dimensioning of the cavity, a sufficiently large connection force for normal operation can be achieved in this way.

Due to the possibility of opening the channel as needed, and thus breaking the vacuum or the negative pressure, the connection force can be reduced (optionally to zero) in the event of an overload, so that the connection is easily released. Damage to other components involved is thus prevented. For this purpose, a trigger mechanism is provided which is designed to open the channel in an automated manner upon the occurrence of a trigger criterion. In particular, damage to transfer lines used for liquefied gas or other media, for example, can also be prevented in this way.

It should also be mentioned at this juncture that the specific situation is ultimately what determines whether "only" a negative pressure is generated in the cavity, or whether the cavity is evacuated (in practice, a vacuum implies a certain residual pressure as well). Even at a pressure of, for example, a few, or several tens of, millibars, a sufficiently high force can be exerted by the overpressure. Depending on the type of connection and/or the required connection force, and with suitable dimensioning of the cavity, a sufficiently stable connection between the connection flanges can even be generated at ambient pressure with only a low negative pressure of, for example, several hundred millibar.

As already mentioned, a typical and preferred application of the proposed approach is related to pipes or hoses, or hollow lines in general. The attachment ends of such components also have one or more openings. In this context, lines with multiple pipes or hoses guided in parallel, which will be connected together, are also conceivable. The cavity is then preferably designed in such a manner that it surrounds openings in the attachment ends, in particular with an annular cross-section. In this way, the force generated on the connection flanges by the vacuum or the negative pressure in the cavity is distributed around the openings, in particular also as uniformly as possible. This in turn leads to a stable and secure connection. In order to seal the cavity for the generation of the vacuum or the negative pressure, two seals, in particular annular seals, can be used, for example. These can be or have a suitable material, such as rubber.

A preferred option for closing the channel and for opening it as needed is the use of a valve. The channel itself is expediently formed at least partially, and optionally also completely, in one of the two connection flanges. In this case, the valve can then be provided on the outside of this one connection flange. The valve should then be designed preferably such that, for example, a vacuum pump for evacuating the cavity or for generating the negative pressure therein can be connected.

A particular advantage of the proposed approach is the provision of the trigger mechanism, which is designed to open the channel in an automated manner upon the occurrence of a trigger criterion—for example, by a corresponding actuation of the valve. Such a trigger mechanism can be used, for example, in the event of the overload already mentioned above, in order to automatically break the vacuum in the cavity and thus create a manner of predetermined breaking point. This can then be referred to as a vacuum-assisted predetermined breaking point. The coupling of the trigger mechanism to a movement of one of the components, or of a container or a tank or the like connected thereto, can be contemplated in this case, for example. This means that the trigger mechanism automatically opens the channel upon a movement of one of the components, or of a container or tank connected thereto. In other words, the trigger criterion comprises a movement of one of the components, or of a container or tank connected thereto.

If, for example, a movement of a tanker ship, into which liquefied gas is transferred by means of the transfer line, is detected (for example, due to a wave in the sea), the vacuum can be broken in order to prevent further damage due to the overload caused by the drifting tanker ship. Instead, the connection would then be relatively easily separated. In this case, it must be considered that at least the then-open connection point should be closed in another way—for example, by closing a corresponding valve on the storage tank from which the liquefied gas is taken. This can also be automated and optionally coupled to the trigger mechanism.

In principle, however, such a trigger mechanism can be triggered more or less in any arbitrary manner. Depending on the situation, this can take place mechanically or electrically. It is conceivable, for example, to use an electromagnetic valve which remains closed, and holds the vacuum in the cavity, only when a certain flow of current is present. If the current flow is interrupted, the vacuum is broken. In other words, the electromagnetic valve opens when the current flow is interrupted. However, it is also conceivable, for example, to provide a mechanical cable pull device or the like, or only a bursting disc which can be opened and/or destroyed manually if necessary.

The aforementioned connection means, such as screw connections, can still be used for establishing the connection. Due to the connection force generated by the vacuum (or the negative pressure), however, these connection means can be significantly weaker than previous designs. Instead, it may be sufficient for the connection flange to only be held together with such connection means until the vacuum is generated. It may also be that, even after the vacuum is broken, a certain cohesion of the connection flange is desired. So-called expansion screws can also be contemplated as connection means. In principle, however, a suitable configuration of the connection flange can also be contemplated which makes such additional connection means optionally entirely unnecessary.

The subject matter of the invention is also a connection device for producing a connection between attachment ends of two components that are to be connected, wherein one connection flange is provided at each attachment end, wherein a sealable cavity can be formed between sides of the two connection flanges that are to face each other, in which cavity a negative pressure (or vacuum) can be generated, and wherein a closable channel, which can be opened if necessary, is provided between the cavity and a surrounding environment.

With regard to further embodiments and advantages of the connection device, reference is also made to the above statements regarding the method, which apply accordingly here.

The subject matter of the invention is also a transfer line for liquefied gas, having multiple portions, wherein one or more of the named connection devices is provided in each case in order to connect two portions of the transfer line to each other.

The invention is schematically represented in the drawing using an exemplary embodiment and is described below with reference to the drawing.

BRIEF DESCRIPTION OF THE DRAWING

FIG. 1 schematically shows a transfer device connection device according to the invention in a preferred embodiment.

FIG. 1 schematically shows a connection device 100 according to the invention in a preferred embodiment, which will be explained in more detail below along with an explanation of an associated method according to the invention. By way of example, the device 100 is used to connect two portions 111 and 121 of a liquefied gas transfer line 101 to each other. By means of the transfer line 101, liquefied gas will be transferred from a first container 190 (for example, a storage container) into a second container 192 (for example, in a tanker ship). A valve 191 is also provided by way of example on the first container 190.

It should be noted at this juncture that the connection device 100 can ultimately be located at a suitable location of the transfer line, and optionally directly on one of the containers 190, 192—for example, on a connection piece. Multiple such connection devices 100 can also be provided, if necessary. The shown location is solely used as an example, serving only to illustrate the invention. The connection device 100 itself is also shown in a different scale and in greater detail than the rest of the transfer line and the containers.

The connection device 100 serves to establish a connection between the two attachment ends 110 and 120 of the two components 111, 121 that are to be connected, the same designed as portions of a transfer line. In accordance with the components being designed as portions of a transfer line, or a line in general, the attachment ends 110, 120 are tubular in design—i.e., with an outer wall which delimits a free space in the interior. This is also illustrated accordingly. These free spaces thus form an opening at each end, which is denoted by the number 124 for the attachment end 120, by way of example.

Furthermore, a connection flange 112 or 122 is provided on each attachment end 110, 120. The attachment ends 110, 120 can each be an end piece of the respective line portion 111, 121, or a separate part, and optionally also welded or otherwise attached. The connection flanges 112, 122 in turn can be welded or otherwise connected to the attachment end 110, 120. However, it is also conceivable that they are formed in one piece therewith and thus form part of the attachment ends 110, 120.

A sealable and evacuable cavity 130 is provided between sides of the two connection flanges 112 and 122 which will face each other. This cavity is formed on the one hand by the two mentioned sides and/or the surfaces of the connection flanges 112 and 122 there, and on the other hand by two annular seals and/or sealing rings 140 and 142. These seals can be made, for example, of rubber, although other materials can also be selected according to the intended use of the connection and/or the components that are to be connected with it. The seal 140 is arranged on the inner side of the connection flange 110, 120—i.e., it faces the free space in the interior of the attachment ends and/or their openings 124; in contrast, the seal 142 is arranged on the outer side of the connection flange 110, 120—i.e., it faces the surrounding environment.

Furthermore, a channel 132 is provided between the cavity 130 and the surrounding environment, which channel is formed in the connection flange 110 in the example shown, for example as a corresponding bore or the like. Whereas the connection of the channel 132 to the cavity 130 is open, at the other end of the channel—that is, towards the surrounding environment—a valve 134 is provided. The channel can be closed by means of the valve 1343 and can be opened if necessary.

Furthermore, a vacuum pump 150 which is connected to the valve 132 is shown. When the valve 130 is open, the cavity 130 can be evacuated when the vacuum pump 150 is actuated, or at least a negative pressure can be generated therein. When the cavity 130 is evacuated and/or the generated negative pressure is sufficiently large, the valve 130 can be closed. By means of the vacuum or the negative pressure in the cavity 130, a force is thus generated from the outside onto the connection flanges 110, 120, which presses them against each other and thus connects the attachment ends 110, 120 and/or the portions 111, 121 to each other.

At this point it should be mentioned that the cavity does not necessarily have to have the shape or form shown here. Other shapes of the mutually facing sides of the connection flanges 110, 120, or also only of one connection flange, are conceivable, for example. The fact that a cavity is formed at all that can be evacuated or in which a vacuum or at least a negative pressure can form it what is ultimately decisive. The seals can also be designed differently. The channel 132 also does not have to have the shape shown; rather, it could, for example, extend continuously perpendicularly through one of the connection flanges.

Furthermore, two screws 114 with associated nuts 115 are shown by way of example (only one of them with reference signs). The screws are in each case guided and screwed through suitable openings or holes in the two connection flanges 110, 120. In this way, additional stability can be achieved. It should be understood that, in any case in the situation shown by way of example, a suitable sealing of the openings or passages for the screws must be provided, so that the cavity 130 can be evacuated. For this purpose, for example, further sealing rings are conceivable between the two connection flanges 110, 120, which surround the screws and thus ultimately remove certain regions from the cavity 130. Likewise, the screws and/or the necessary passages can also be arranged outside the cavity 130, or the seals 140, 142 can be arranged such that the screws or passages are excluded from the cavity 130.

Furthermore, a trigger mechanism 136 is provided on the valve 134, which, by way of example, can be via a signal 196, which can in turn be output by a measuring or detection device 194 on the second container 192 if, for example, a specific trigger criterion such as a movement of the second container 192 is detected. In such a case, however, the trigger mechanism 136 can automatically open the channel 132, for example by opening the valve 134. However, it is also conceivable that, as already mentioned above, the valve itself is an electromagnetic valve that remains closed by energization. In this case, the signal 196 can also be an interruption of the power supply, as a result of which the channel 132 is opened. The trigger mechanism would then be integrated into the valve.

After all, it is particularly important that the channel 132 can be opened (automatically) in the presence of a trigger criterion, and consequently the vacuum in the cavity 130 can be broken, so that the connection force acting on the connection flanges 110, 120 due to the negative pressure or the vacuum is reduced, in particular down to zero. The connection flanges 110, 120 are then held together only by the screws 114 or nuts 115, which are in particular designed to be weak. This connection then only withstands a certain overload, and releases the connection beyond it. In this way, a vacuum-assisted predetermined breaking point is thus formed.

Furthermore, it can then be provided that, when the connection is released and/or disconnected, for example, the valve 191 is closed, optionally automatically, for example also via the signal 196, in order to avoid further outflow from the first container 190.

The invention claimed is:

1. A method for producing a connection between attachment ends of two components that are to be connected, by means of two connection flanges, each of which is provided at one attachment end, the method comprising:
    forming a sealable cavity is formed between sides of the two connection flanges that are to face each other,
    providing a closable channel, which can be opened when needed, between the cavity and a surrounding environment,
    closing the channel and generating a negative pressure in the cavity, and
    providing a trigger mechanism which is configured to open the channel in an automated manner upon occurrence of a trigger criterion.

2. The method according to claim 1, wherein the channel is designed to be closable, and can be opened when needed, by means of a valve, and wherein the trigger mechanism is configured to open the channel in an automated manner by actuating the valve upon the occurrence of the trigger criterion.

3. The method according to claim 2, wherein the trigger mechanism is configured to be triggered via a signal upon the occurrence of the trigger criterion.

4. The method according to claim 1, wherein the trigger mechanism is coupled to a movement of one of the components, or of a container or a tank connected thereto.

5. The method according to claim 1, wherein the trigger mechanism is electrically triggered.

6. The method according to claim 2, wherein the valve is an electromagnetic valve which remains closed when energized and opens when a flow of current or a power supply is interrupted.

7. The method according to claim 1, wherein the trigger mechanism is triggered mechanically.

8. The method according to claim 1, wherein the connection is between two attachment ends of portions of a liquefied gas transfer line.

9. A connection device for producing a connection between attachment ends of two components that are to be connected, wherein each attachment end is provided with a connection flange, wherein the connection device comprises:

a sealable cavity, in which a negative pressure can be generated, which can be formed between sides of the two connection flanges that are to face each other, a closable channel, which can be opened when needed, between the cavity and a surrounding environment, and a trigger mechanism which is configured to open the channel in an automated manner upon occurrence of a trigger criterion.

10. The connection device according to claim 9, further comprising a valve designed in such a manner that the channel can be closed and can be opened as needed, wherein the trigger mechanism is configured to open the channel in an automated manner by actuating the valve upon the occurrence of the trigger criterion.

11. The connection device according to claim 10, wherein the trigger mechanism is configured to be triggered via a signal upon the occurrence of the trigger criterion.

12. The connection device according to claim 9, wherein the trigger mechanism is coupled to a movement of one of the components, or of a container or a tank connected thereto.

13. The connection device according to claim 9, wherein the trigger mechanism is configured to be electrically triggered.

14. The connection device according to claim 10, wherein the valve is an electromagnetic valve which is configured to remain closed when energized, and to open when a flow of current or a power supply is interrupted.

15. The connection device according to claim 9, wherein the trigger mechanism is configured to be triggered mechanically.

16. A method comprising producing a connection between the attachment ends of the two components that are to be connected using the connection device according to claim 9, wherein connection is releasable in an automated manner upon occurrence of the trigger criterion.

17. The method according to claim 16, wherein the connection is between two attachment ends of portions of a liquefied gas transfer line.

18. A transfer line for liquefied gas, comprising multiple portions which are connectable or connected to each other by means of at least one connection device according to claim 9.

* * * * *